United States Patent [19]

Spalding et al.

[11] Patent Number: 5,289,342
[45] Date of Patent: Feb. 22, 1994

[54] SYSTEM WITH COOLING OF ELECTRONIC COMPONENTS ON A CIRCUIT BOARD

[75] Inventors: Tom J. Spalding, Gloucester; Keith E. Kowal, Marblehead; James H. Bleck, Chelmsford; Scott H. Wakefield, Andover; John E. Thrailkill, Lowell, all of Mass.

[73] Assignee: Ergo Computing, Inc., Peabody, Mass.

[21] Appl. No.: 973,262

[22] Filed: Nov. 9, 1992

Related U.S. Application Data

[62] Division of Ser. No. 711,816, Jun. 7, 1991, Pat. No. 5,187,645.

[51] Int. Cl.⁵ .............................................. H05K 7/20
[52] U.S. Cl. ..................................... 361/699; 165/46; 257/714; 361/761; 439/485
[58] Field of Search ................ 439/608, 485; 361/382, 361/385, 395, 399, 400, 401, 415, 412, 413, 689, 699, 736, 752, 761, 784, 785; 174/15.1; 165/46, 80.4, 104.19, 104.33; 257/707, 713, 714

[56] References Cited

U.S. PATENT DOCUMENTS

| | | | |
|---|---|---|---|
| 4,092,697 | 5/1978 | Spaight | 361/386 |
| 4,558,270 | 12/1985 | Liautaud et al. | 439/929 |
| 4,569,567 | 2/1986 | Zucchini | 439/639 |
| 4,596,436 | 6/1986 | Kramer et al. | 439/680 |
| 4,598,308 | 7/1986 | James | 361/401 |
| 4,619,489 | 10/1986 | Hinkens | 439/502 |
| 4,701,003 | 10/1987 | Gruet | 439/929 |
| 4,740,167 | 4/1988 | Millhumes et al. | 439/222 |
| 4,771,365 | 9/1988 | Cichocki | 361/387 |
| 4,850,897 | 7/1989 | Hard | 439/502 |
| 4,858,162 | 8/1989 | Kieffer et al. | 364/708 |
| 4,931,908 | 6/1990 | Boucard | 361/401 |
| 4,941,845 | 7/1990 | Eppley et al. | 439/502 |
| 4,952,755 | 8/1990 | Engel et al. | 439/136 |
| 4,956,561 | 9/1990 | Tamer | 439/638 |
| 4,981,438 | 1/1991 | Bekhiet | 439/502 |
| 4,982,311 | 1/1991 | Dehaine | 361/388 |
| 4,985,804 | 1/1991 | Campbell et al. | 361/415 |
| 4,997,032 | 3/1991 | Danielson | 165/46 |
| 5,000,256 | 3/1991 | Tousignant | 361/385 |
| 5,000,692 | 3/1991 | Taniguchi et al. | 439/502 |
| 5,006,924 | 4/1991 | Frankeny et al. | 361/385 |
| 5,007,478 | 4/1991 | Sengupta | 361/385 |
| 5,011,418 | 4/1991 | Perzentka, Jr. | 439/135 |
| 5,026,295 | 6/1991 | Fong et al. | 439/135 |
| 5,030,128 | 7/1991 | Herron et al. | 439/639 |
| 5,502,943 | 10/1991 | Davis | 439/929 |

FOREIGN PATENT DOCUMENTS

| | | | |
|---|---|---|---|
| 93398 | 11/1983 | European Pat. Off. | 439/502 |
| 2-288176 | 11/1990 | Japan | 439/638 |
| 675652 | 10/1990 | Switzerland | 439/638 |
| 2167906 | 6/1986 | United Kingdom | 361/386 |

OTHER PUBLICATIONS

Thermal-Modules, Hultmark et al, IBM Tech Discl Bull, vol. 19 No. 8 Jan. 1977, p. 3127.

IBM Technical Disclosure Bulletin, vol. 29, No. 5, Oct. 1986, "Vertical Stand Assembly For Electronic Enclosure," pp. 1972–1974.

Primary Examiner—Gerald P. Tolin
Attorney, Agent, or Firm—Hamilton, Brook, Smith & Reynolds

[57] ABSTRACT

The system includes a circuit board on which electrical components are mounted. The components are mounted on the front side of the board, and the back side of the board is thermally coupled to the housing by a liquid-filled thermal heat sink pouch between the board and the housing. A heat generating component such as a microprocessor is mounted to the front side of the board, but the top surface of the component is directed toward the back side of the board such that it is also thermally coupled to the housing.

4 Claims, 17 Drawing Sheets

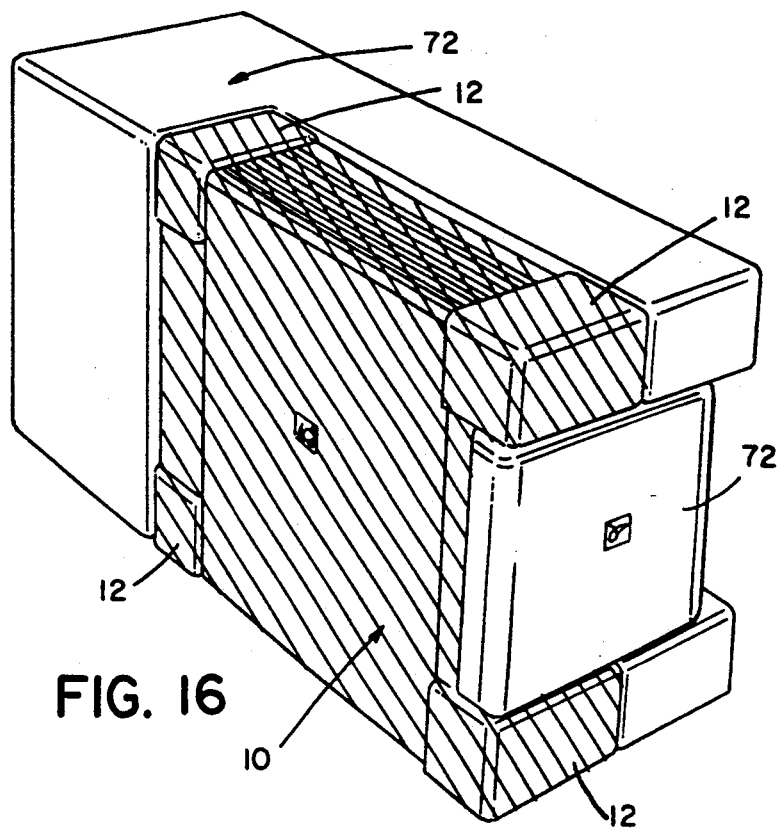
FIG. 16
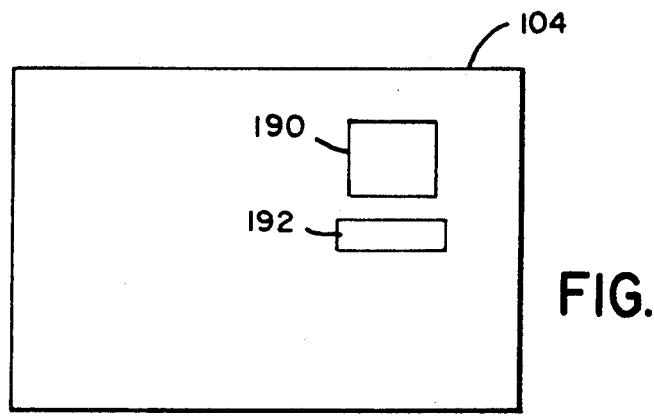
FIG. 17A
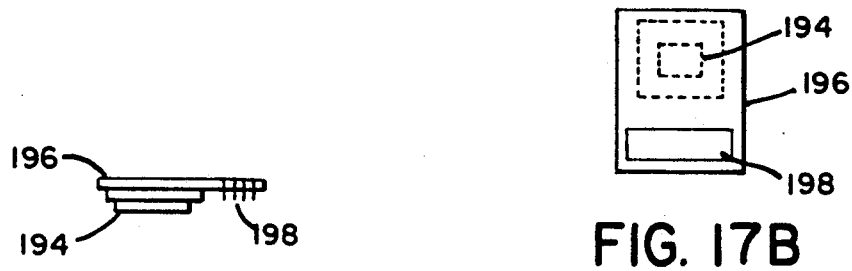
FIG. 17C
FIG. 17B

SYSTEM WITH COOLING OF ELECTRONIC COMPONENTS ON A CIRCUIT BOARD

This application is a division of application Ser. No. 07/711,816 filed on Jun. 7, 1991. now issued U.S. Pat. No. 5,187,645.

BACKGROUND OF THE INVENTION

Currently computer systems are available in many different sizes and processing abilities. At the top of the spectrum of size and processing ability are the large mainframe systems. These systems are typically quite large and have significant processing ability. Beneath the mainframe systems in the hierarchy of computer systems are mini-computer systems. The mini-computer systems constitute those systems that are smaller than the mainframes but still have significant processing ability. Microcomputer systems are positioned one step lower in the hierarchy. The microcomputer systems are often referred to as personal computers. Lastly, the lap-top computers occupy the bottom rung of the hierarchy. The lap-tops are relatively small in size and light in weight to facilitate portability. The name lap-top implies that the systems may be used on the user's lap.

SUMMARY OF THE INVENTION

The present invention concerns a portable microprocessor system having a microprocessor for processing instructions and a main housing for housing the microprocessor. Connectors are included in the system to provide the capability to connect the system with peripheral devices. A docking connector allows all peripheral connections to be realized through a single connector. The docking connector, thus, greatly simplifies coupling and decoupling of the system with peripherals, for only a single connection needs to be engaged or disengaged. By simplifying connection with the peripherals, the docking connector enhances the portability of the system and the likelihood that users will exploit the portability of the system.

When the docking connector is employed, the main housing rests in the docking connector. The connection created by the main housing and the docking connector enables communications between the microprocessor and the peripheral devices. The docking connector includes a pin connector and an ejector. The pin connector connects with corresponding connections on the housing. The ejector, in contrast, is used to decouple the housing from the docking connector.

Preferably, the docking connector is coupled to a peripheral connection port that provides an interface for connecting the peripheral devices and power source to the docking connector. Use of the peripheral connection port provides added space at the user workspace so that the user desktop is not cluttered. The docking connector may further comprise a network integrated circuit card for facilitating connection of the microprocessing system to a network.

Preferably, the main housing is at most 12 inches in length, at most 9 inches in width, and at most 4 inches in height. Moreover, the main housing weighs less than 10 pounds, specifically approximately eight pounds. The small size and light weight of the system make it especially portable. In fact it is small enough and light enough to carry in an attaché case.

To reduce power requirements and noise, internal electronics are thermally coupled to a metallic housing which serves as a heat sink. A thermostatically controlled fan may be built into the system to furnish cooling for the system only when the heat sink cooling is insufficient. The cooling effect of the fan is enhanced by vents in the main housing that encourage air flow through the housing. Pouches of thermally conductive material are placed in thermal communication with the integrated circuit boards to aid in conducting heat from the electrical components out to the heat sink housing. In normal environments, operation of the fan is not required so the computer is virtually silent.

Amongst the options available with the system are a disk drive and a hard disk. Other options available include a keyboard, visual display and a battery pack (for providing direct current (dc) power to the system).

Internally, the major hardware components of the microcomputer system are configured on integrated circuit boards. In particular, a first integrated circuit board is positioned within the housing so that the electrical components of the first integrated circuit board face the electrical components of a second integrated circuit board. In one embodiment the heat generating microprocessor is mounted on a daughter board and faces in a direction opposite other components toward the thermally conductive material.

In the preferred embodiment an additional set of connectors, in addition to the single housing connector previously described, is positioned on the housing to provide a choice for connecting the system with peripheral devices. Thus, the housing connector comprises an alternate set of redundant pins for all of the peripheral device interfaces. A dust cover may be provided to cover this additional set of connectors when the set is not in use. These additional connectors allow the user to choose the connectors he prefers for coupling the peripheral devices with the system. Other options available with the system include a mounting bracket that allows the main housing to be coupled to a fixture such as a wall or desk.

BRIEF DESCRIPTION OF THE DRAWINGS

FIG. 16 shows an expansion unit.

FIG. 17A, B and C illustrate a microprocessor mounted on a daughter board to be positioned in a window in another board.

DETAILED DESCRIPTION OF THE PREFERRED EMBODIMENT

In accordance with the present invention a microcomputer works equally well for business applications as it does for personal applications. In particular, it is well suited for personal applications because of its small size and light weight, whereas it is also well suited for business applications because of its processing power, large memory and compatibility with networks.

Figure 1:
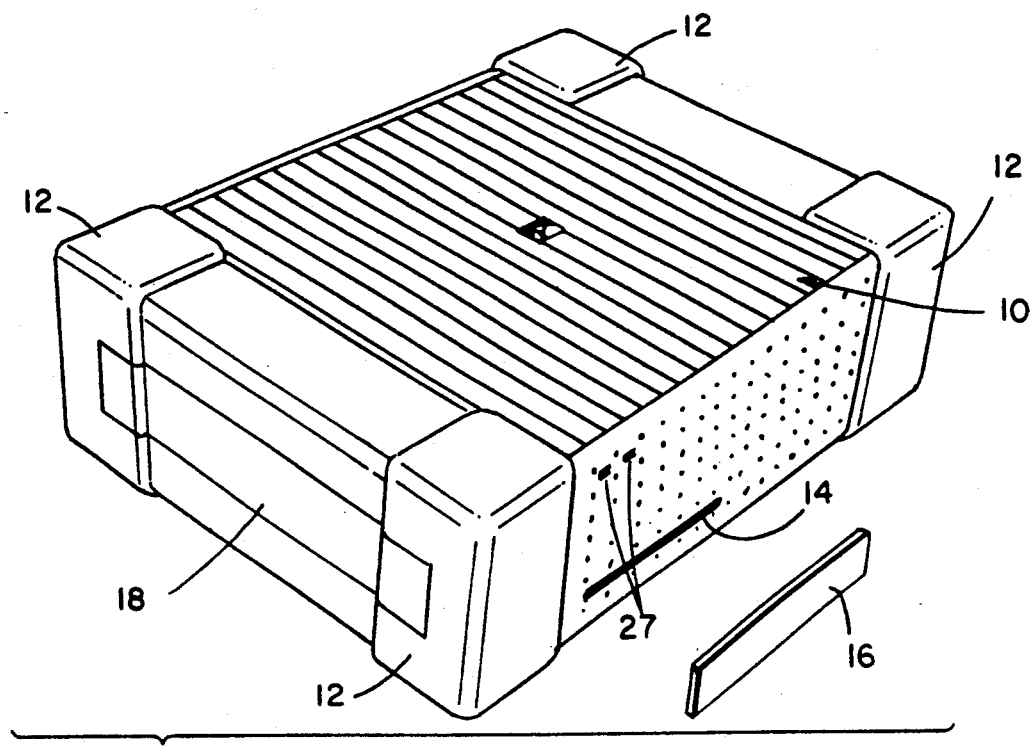
FIG. 1 is a perspective view of the main housing of the microcomputer system.
Figure 2:
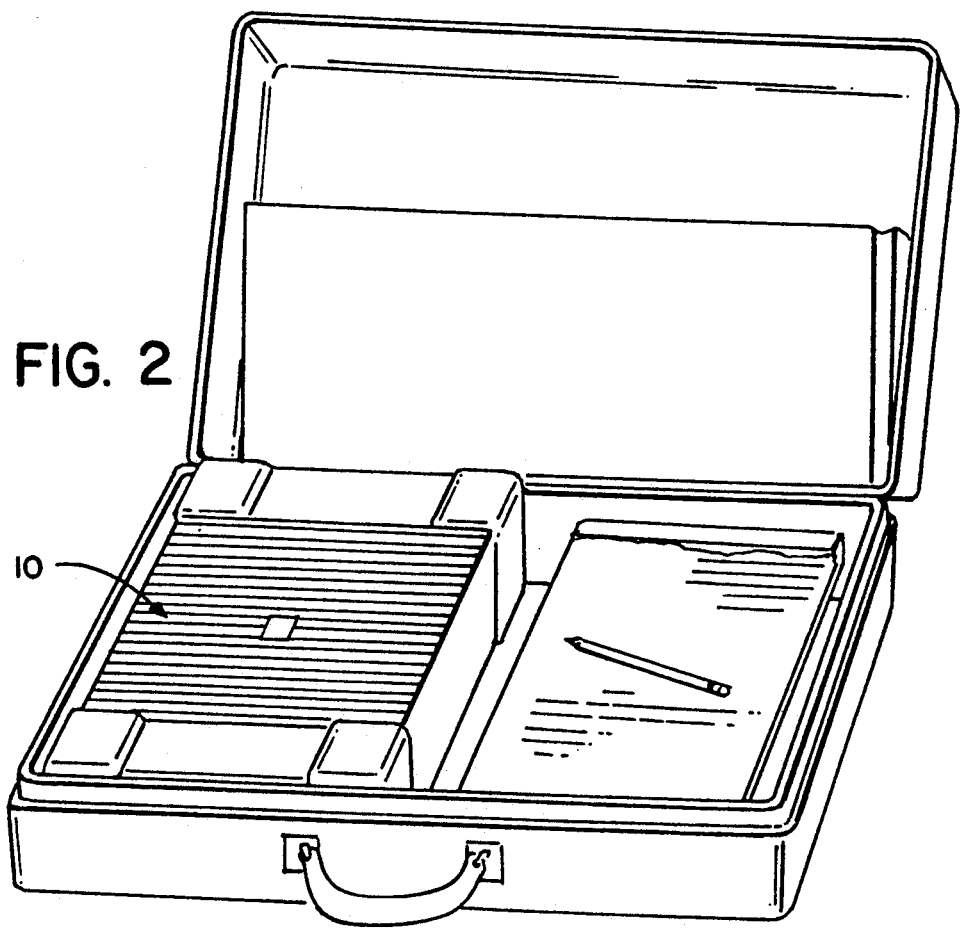
FIG. 2 shows the main housing in an attaché case.

FIG. 1 depicts the main housing 10 of the microcomputer of the present invention. The aluminum main housing 10 provides a durable and lightweight outer shell and also serves as a heat sink. Rubber stops 12 are positioned about each of the four corners of the housing 10 to prevent the main housing 10 from moving and to enhance the safety of the system by covering sharp corners of the main housing 10. Also, the housing can be set on a surface in any orientation without marring the surface or housing and while maintaining an air gap between the surface and housing. As can be seen in FIG. 1, the polyhedral shape of the main housing 10 resembles a brick. The main housing 10 has a height of about 11.3 inches, a width of about 7.9 inches and a thickness of about 3.3 inches. These dimensions enable the main housing 10 to be readily placed in most attaché cases such that the main housing 10 occupies only one half of such an attaché case as shown in FIG. 2. The other half of the attaché case can, therefore, be used to store additional business items such as notepads, notebooks and the like. Not only is the system small in size but also it is light in weight. The main housing 10 and its contents weigh only approximately 8.4 pounds. The combination of small size and light weight make this system especially portable.

Figure 3:
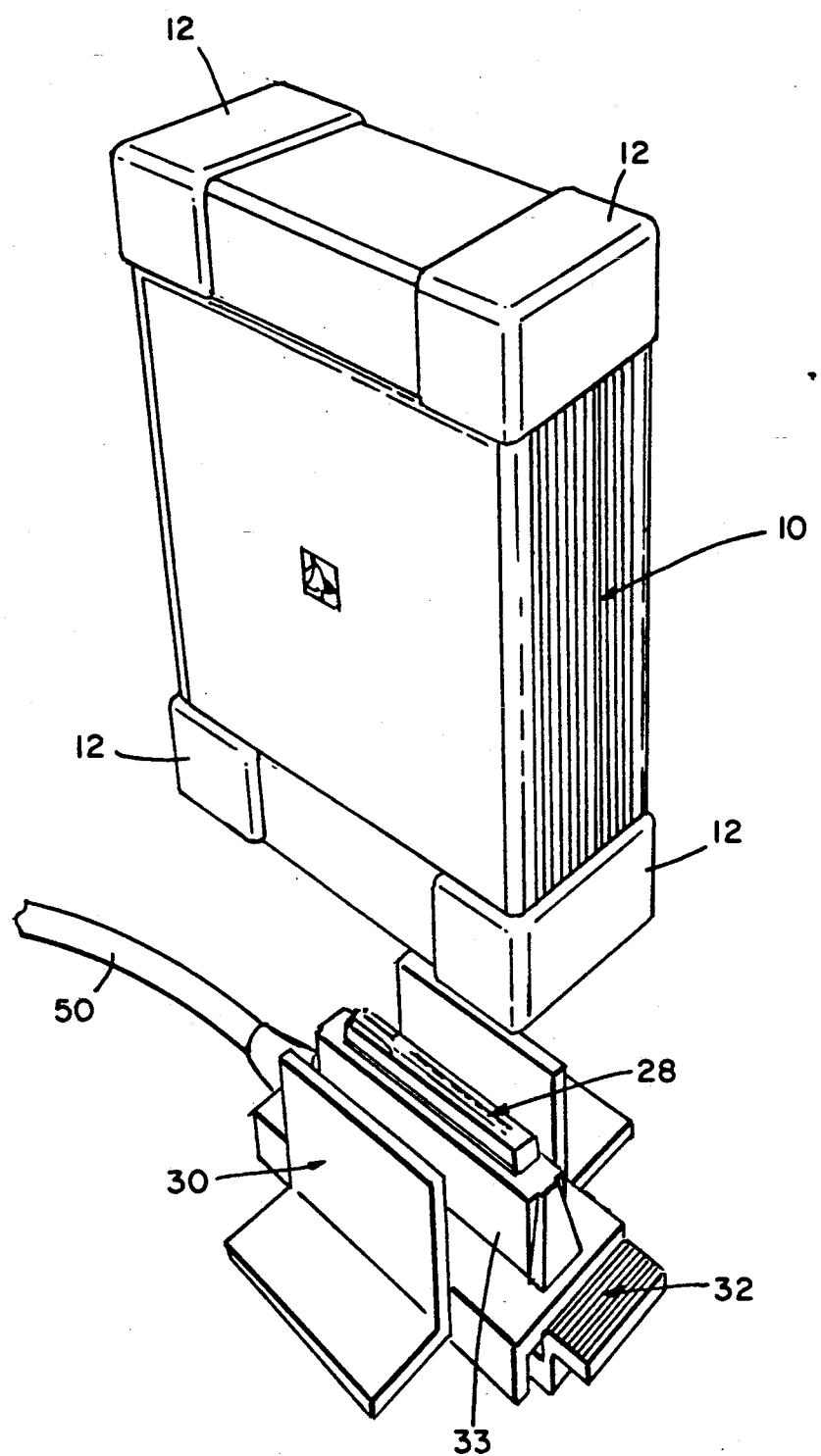
FIG. 3 shows the main housing in relation to the docking connector and the cradle.

An optional 3.5 inch disk drive 14 may be located at the front face of the main housing 10. When a disk drive option is not desired, a cover 16 may conveniently cover the opening for the disk drive 14. The main housing 10 also includes a docking door 18 that protects the housing connector. The housing connector is comprised of four rows of male pins that constitute 180 pins in total. This housing connector may be interfaced with a docking connector 28 such as shown in FIG. 3. The docking connector 28 pushes the door 18 out of the way when coupling with the housing connector behind the door. The door 18 is a flap similar to those employed in many current automobile cassette systems. The docking connector 28 condenses all of the peripheral connectors into a single connector. As such, all connections to the peripherals are realized through the single connection of the docking connector 28. By unifying the connectors in this manner, the docking connector 28 heightens the portability of the system, for only one connection is necessary to disconnect the system or connect the system.

In the embodiment shown in FIG. 3, the docking connector 28 is coupled to a cradle 30. The cradle 30 supports the main housing 10 when the docking connector 28 is used so that the main housing may sit upright in the cradle 30. By placing the docking door at an end of the brick-shaped housing, the housing stands in the cradle on end and thus minimizes the footprint of the operating unit.

To complete the connection between the docking connector 28 and the housing connector behind the docking door 18, the main housing 10 is lowered down into the cradle 30, and the main housing 10 is pushed downward to complete the connection between the housing connector and the docking connector 28. The force required to separate the 180 pins generally prevents this connection from being inadvertently disconnected. Given the strength of the connection, an ejector 32 is provided for decoupling the docking connector 28 from the housing 10. Depression of the ejector 32 brings about actuation of cams (not shown) located inside the ejector collar 33. The actuation of the cams results in decoupling of the docking connector 28 with the main housing 10.

Figure 4:
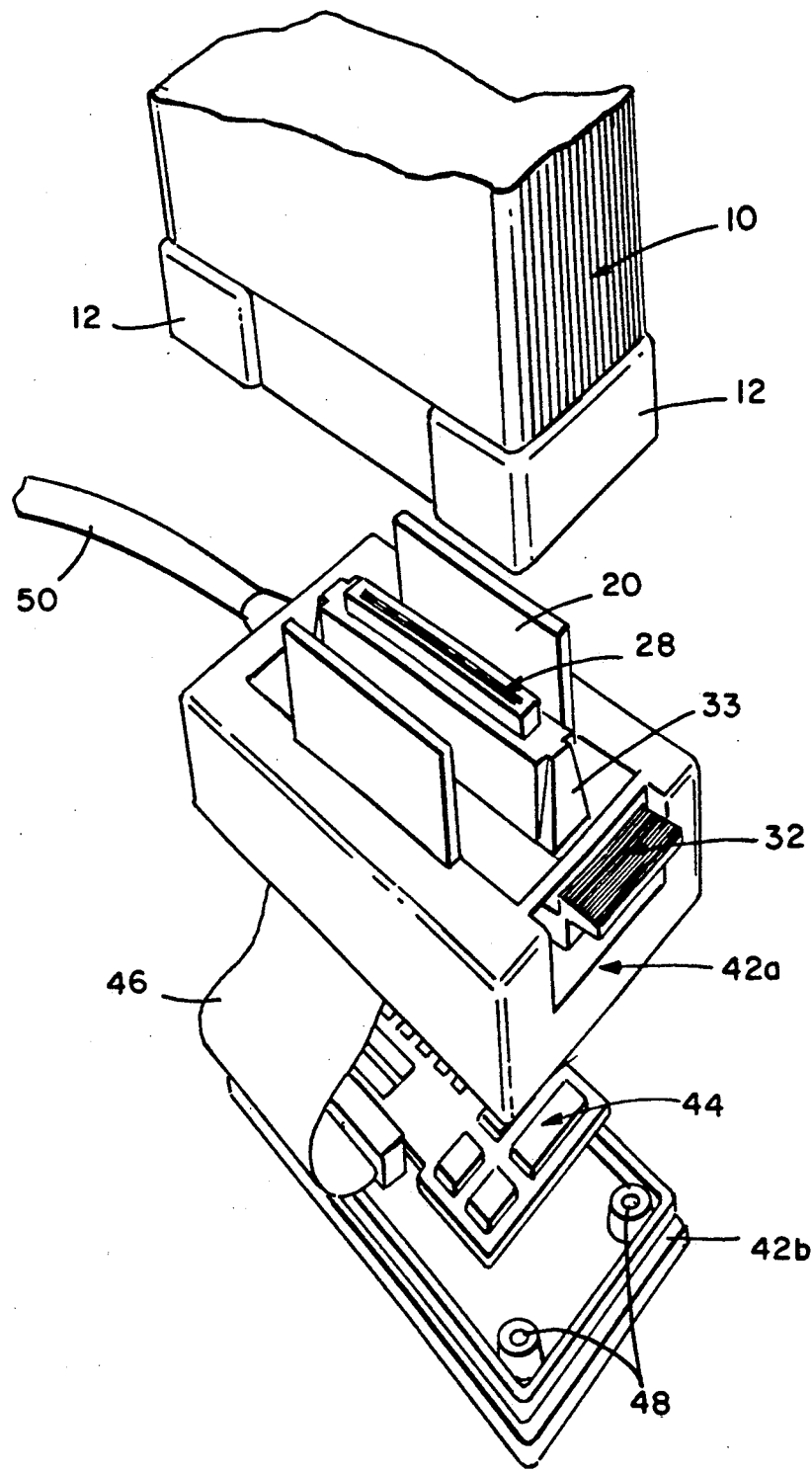
FIG. 4 shows the main housing in relation to an alternative embodiment of the docking connector and the cradle wherein a network card is included in the alternative embodiment.

This embodiment may in addition include a connector housing 42a and 42b (FIG. 4) for holding the previously described docking connector components and for further holding a half-length option card such as a network card 44 to assist in interfacing the system with a network such as a local area network (LAN). The addition of the network card 44 makes the system better adapted for the office environment where networks are often used. The connector housing 42 is comprised of two parts 42a and 42b connected by screws that pass through holes 48. An electrical connector 46 is also included in this embodiment to connect the network card 44 with the docking connector 28.

Figure 5:
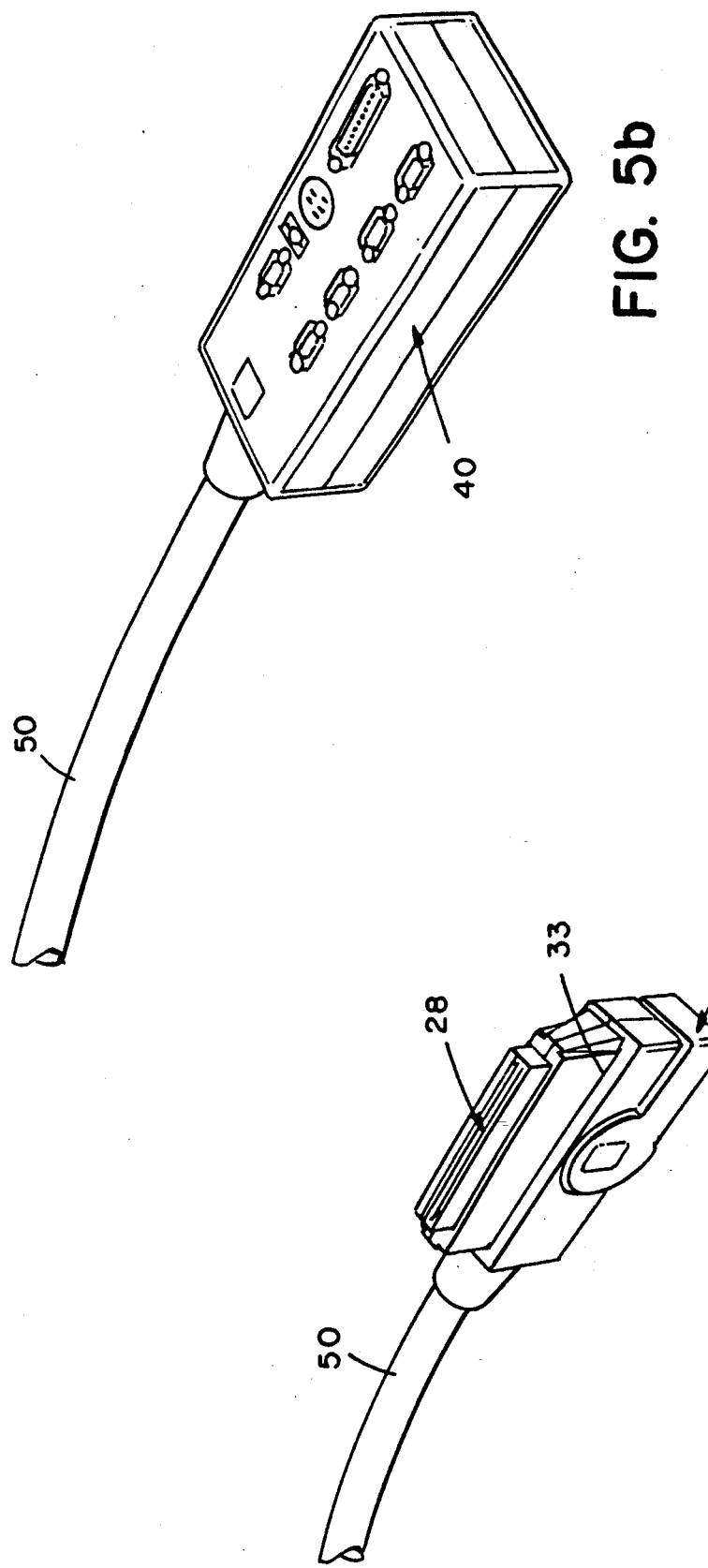
FIG. 5a illustrates the docking connector without the cradle.
FIG. 5b shows the peripheral connection ports.

The connector embodiment in FIG. 3 includes a pigtail 50 that runs to a peripheral connection port 40 (FIG. 5b) which acts as an interface to the peripheral devices. The alternative embodiment of the docking connector 28 that is not coupled to the cradle 30 (FIG. 5a), likewise, employs such a pigtail 50. The alternative embodiment of the docking connector 28 does not support the main housing 10; rather, the main housing 10 remains free-standing, and the connection is made by bringing the docking connector 28 to the main housing 10. The peripheral connection port 40 has a set individual connectors tailored for different types of peripheral devices. The strength of the approach adopted by the present invention lies in that the peripheral devices may remain permanently connected to the peripheral connector port 40 while any coupling or decoupling is performed with the docking connector 28. Thus, a user need not disconnect all the peripheral device connections every time he desires to transport the computer to another location.

The pigtail 50 between the docking connector 28 and the peripheral connection port should not exceed 3 to 5 feet. Pigtails of longer lengths are difficult to drive. It should be born in mind, however, that a pigtail 50 is not even necessary, for the absence of a pigtail 50 does not affect the consolidation of connections into a single connection realized by the docking connector 28. The peripheral connection port 40 may, in fact, be directly coupled to the docking connector 28.

Figure 6:
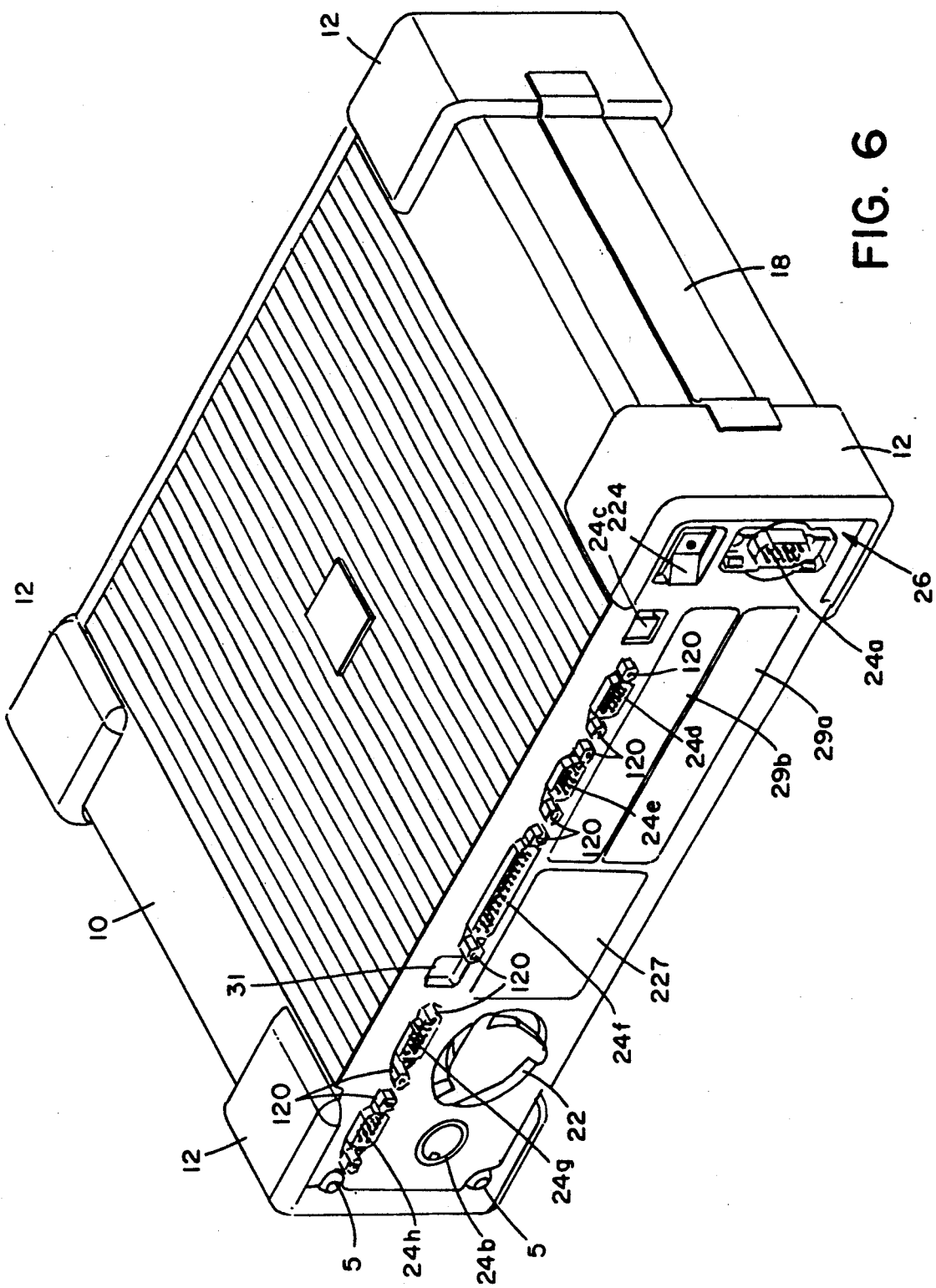
FIG. 6 depicts the rear bezel and components positioned at the rear bezel.

The rear bezel 26 shown in FIG. 6 is secured by screws 5 to the rest of the housing 10. A set of connectors 24a-h that are provided in addition to that behind the docking door 18 is situated at the rear bezel 26 of the main housing 10. The set of connectors 24a–h depicted in FIG. 6 does not facilitate making all connections with a common connector; rather, it relies on individual connectors for each peripheral device. Amongst the connectors 24a–h is a power connector 24a for coupling the system to a power source. In addition, a power switch 224 is included to turn the system on and off. A modem connector 24c is also provided to interface the modem that is built into the system with telephone lines. Next to the modem connector 24c are first 24e and second 24d serial ports. These ports 24d and 24e may be used to connect the system to serial peripheral devices such as a mouse or to other types of serial components. A parallel port 24f is, likewise, provided for making connections with components that transmit or receive in parallel.

Thus, each of these rear bezel connectors is specific to an individual computer peripheral device and allows its corresponding computer peripheral device to communicate with the microprocessor via a computer-peripheral-device-specific data link.

The rear bezel 26 of the main housing 10 further includes connectors 24g and 24h for facilitating connection to a video graphics adapter (VGA) and an extended graphics adapter (EGA), respectively. Moreover, a video switch 31 is furnished so that the system may be properly configured for either of the graphics adaptors (i.e. VGA or EGA). This video switch 31 is necessary because the VGA requires a 15 pin connection, whereas the EGA requires, only a 9 pin connection. The last connector 24b at the rear of the housing is used for connecting a keyboard to the system.

FIG. 6 shows a fan 22 for removing heat generated by the electronic components of the microprocessor. The fan 22 operates only when needed because it is thermostatically controlled. Moreover, the fan 22 operates with little noise and thus, does not inconvenience the user. To maximize the cooling effect of the fan 22, holes 27 are provided in the front face of the housing 10 (see FIG. 1). These holes 27 aid cooling by encouraging cross-flow of air through the main housing 10.

The rear bezel 26 has provisions for two covers 29a and 29b that cover expansion slots to which additional circuit boards may be added to the system. The circuit board configuration will be discussed in more detail below. Lastly, FIG. 6 reveals a speaker 227 that generates audio output.

Figure 7:
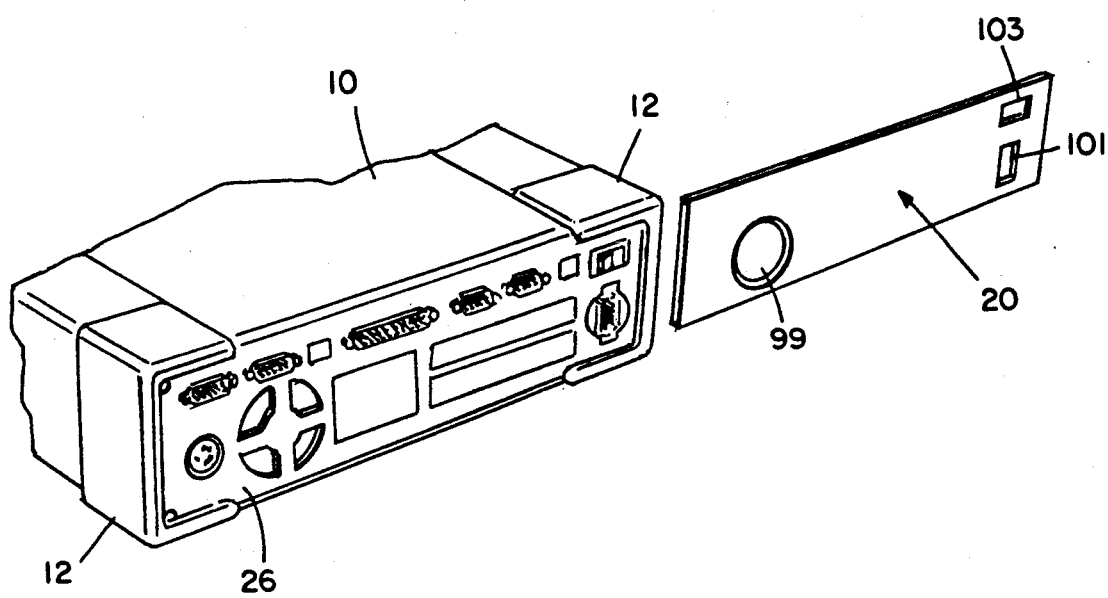
FIG. 7 illustrates the dust cover in relation to the components positioned at the rear bezel.

All of these components as well as all of the above-described components at the rear of the main housing 10 may be covered with a dust cover 20 (shown in FIG. 7) when not in use. A hole 99 in the dust cover 20 allows the fan 22 to operate while the dust cover 20 is in place. Additional holes 101 and 103 are provided in the dust cover 20 to maintain accessibility of the power connector 24a and power switch 224, respectively when the cover is in place.

Figure 8:
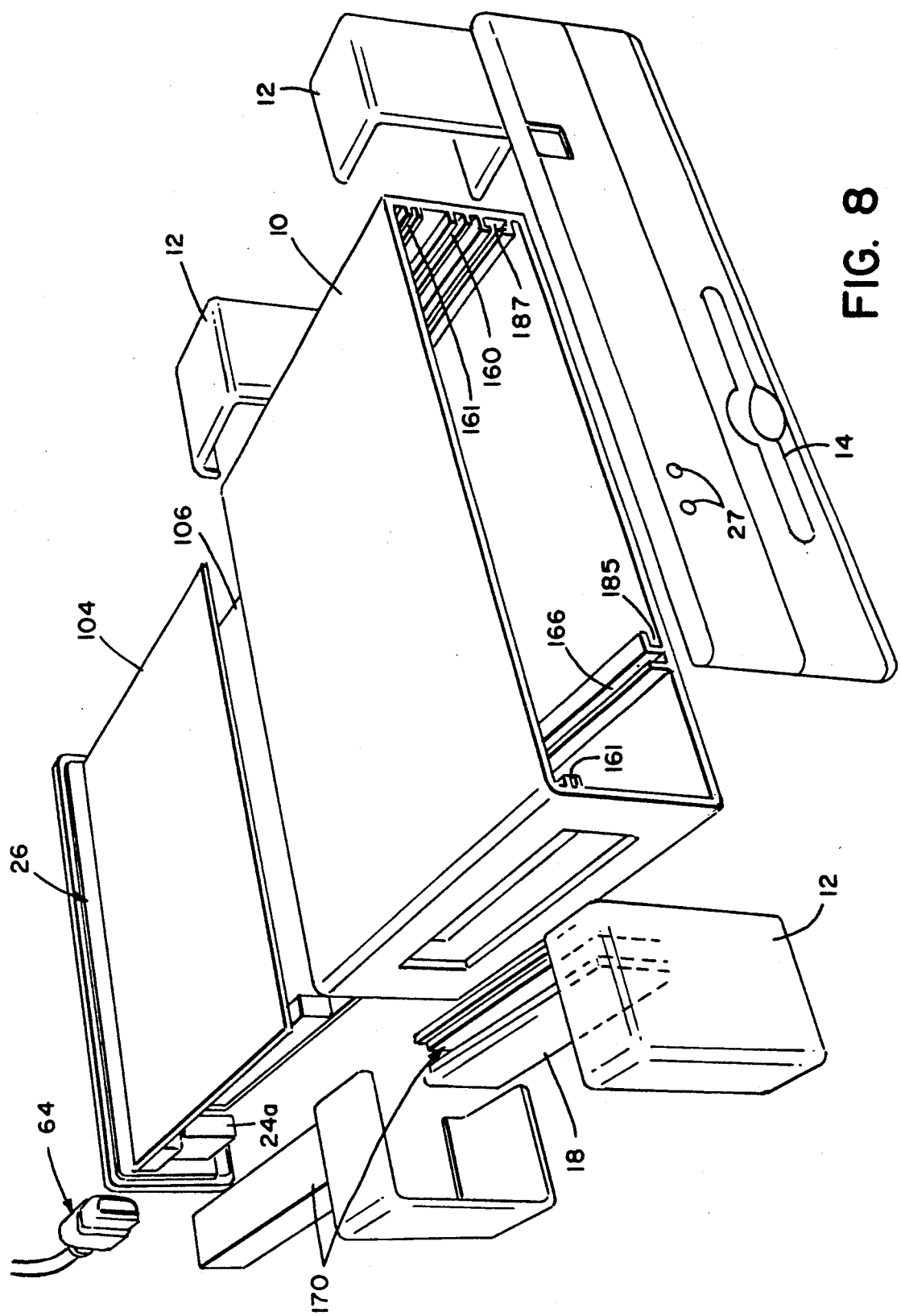
FIG. 8 shows an exploded view of the main housing.

FIG. 8 depicts the housing 10 in exploded form. As this figure reveals, there are two integrated circuit boards 104 and 106 disposed within the housing 10. The first integrated circuit board 104 rests in slots 161 near the main housing 10, whereas the other integrated circuit board 106 rests in a slot 160 provided on the inside of the housing 10. This figure also reveals that a slot 166 is provided for a backplane connector board 164 to fit. Furthermore, electromagnetic interference shields 170 are provided to shield the connectors positioned behind the docking door 18.

Figure 9:
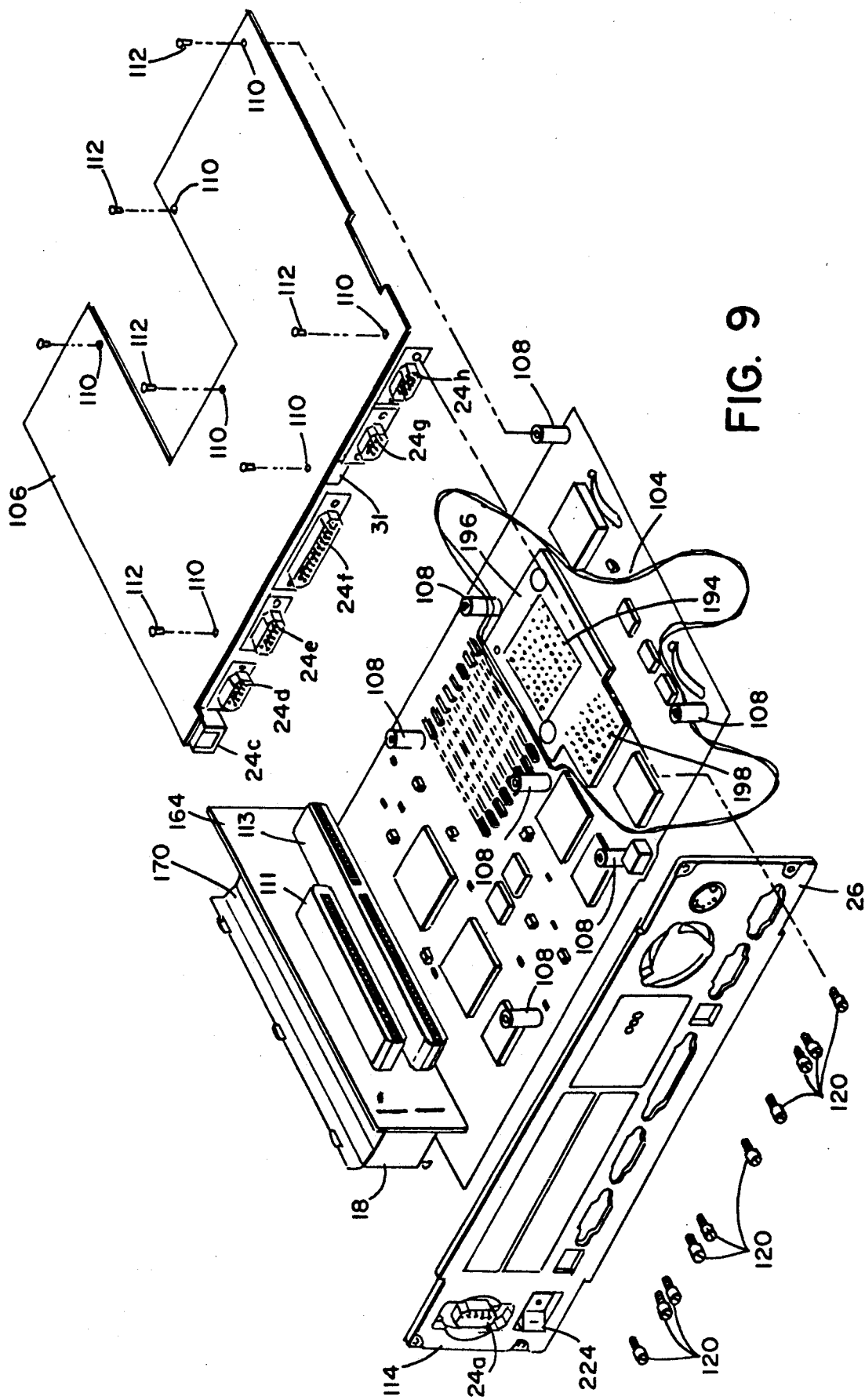
FIG. 9 depicts an exploded view of the integrated circuit boards, rear bezel and expansion connectors.

The two integrated circuit boards 104 and 106 are shown in FIG. 9 relative to the rear bezel 26 that forms the backside of the main housing. It should be noted that the depiction of the system in FIG. 9 is oriented upside-down relative to the depiction of the system in FIGS. 8. The first integrated circuit board 104 (referred to hereinafter as the processor board) holds an Intel 80386SX, 486SX or 486DX microprocessing chip which serves as the CPU for the system. The second integrated circuit board 106 is a peripheral board that handles interactions within the peripheral devices connected to the system via the connectors 24a–h. On these boards are 1 to 32 megabytes of random access memory (RAM). In addition, a 2400 BPS modem is built into the system so that the user has free access to telephone facilities.

An electrically eraseable programmable memory (EEPROM or FLASH) is included in the system. It is used to store a copy of the Basic Input Output System (BIOS). BIOS handles I/O interactions with the peripheral devices. Specifically, BIOS handles translation between the operating system and hardware connections. Given the modem that is incorporated into the system, the system can reconfigure BIOS over the telephone by updating the EEPROM via the modem. The system likewise, contains a video graphics adapter (VGA) and two to four custom gate arrays. The gate arrays are a type of "glue logic" that is used to interconnect custom logic circuits.

The connectors 24c–24h and the switch 31 are connected to the rear bezel 26 through screws 120. Further, screws 112 are passed through holes 110 in the peripheral board 106 down through posts 108 on the processor board 104 to secure the two boards together. FIG. 9 additionally shows the docking door 18 and corresponding connectors 111 and 113 used by expansion boards.

Figure 10:
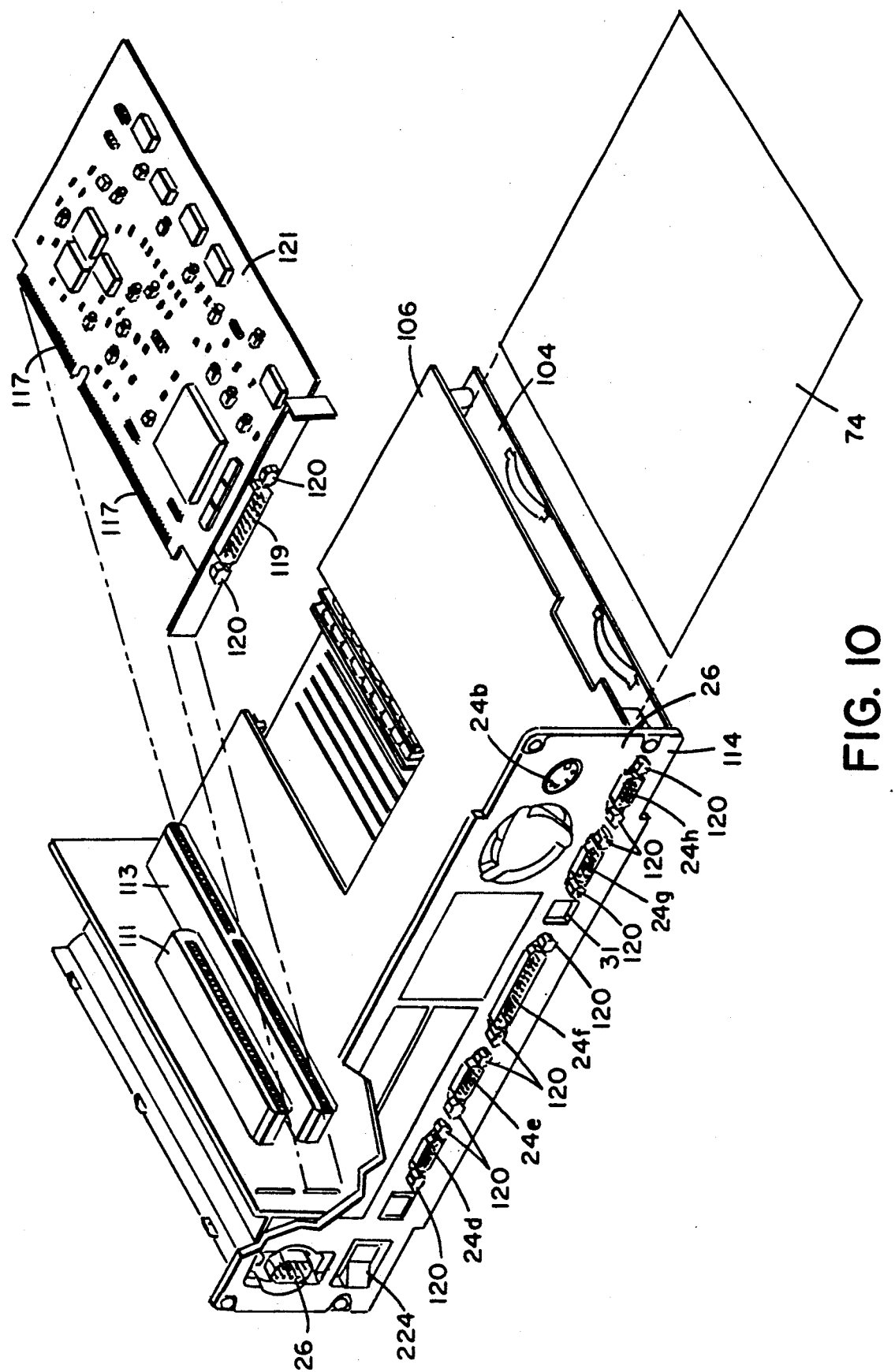
FIG. 10 illustrates a partially exploded view of an ½ length expansion board relative to the integrated circuit boards and the rear bezel.

FIG. 10 indicates how an expansion board 121 can be put in the second expansion slot. In particular, its connections 117 fit into the two connectors 113 so that the board may be connected to the system bus. Further, a connector 119 is provided on the expansion board 121 that fits into the rear of bezel 26. It takes the place occupied by the cover 29b and is secured to the bezel 26 via screws 120. This additional connector 119 enables the expansion board 121 to be accessed through the set of connectors at the rear bezel 26. An additional ½ length expansion board can be connected via connectors 111 to fill the other expansion board slot. The expansion boards may be any standard ISA8 or 16 bit AT form factor half length card.

To enhance heat transfer away from the electronic components, a pouch of thermally conductive material 74 is placed between the main housing 10 and the rear face of the processing circuit board 104 (as shown in FIG. 10). A suitable material is "FLOURINERT" produced by the Minnesota Mining and Manufacturing Company. Thus, heat from boards 104 and 106 travels via pouch 74 to the main housing 10 where it is dissipated.

A preferred configuration for maximizing heat transfer from the microprocessor is illustrated in FIGS. 17A, B and C. As shown in FIG. 17A, the board 104 has a window 190 and an adjacent connector socket or pin array 192. As shown in FIGS. 17B and C, the microprocessor 194 is mounted on a daughter board 196 having a pin array or connector socket 198 to connect to the socket or array 192. When the socket and array 192, 198 are connected, the microprocessor protrudes through the window 190 to press against the liquid filled heat sink pouch 74. The microprocessor thus faces to the rear of the board 104 away from other components for direct heat transfer through the pouch to the housing.

Figure 11:
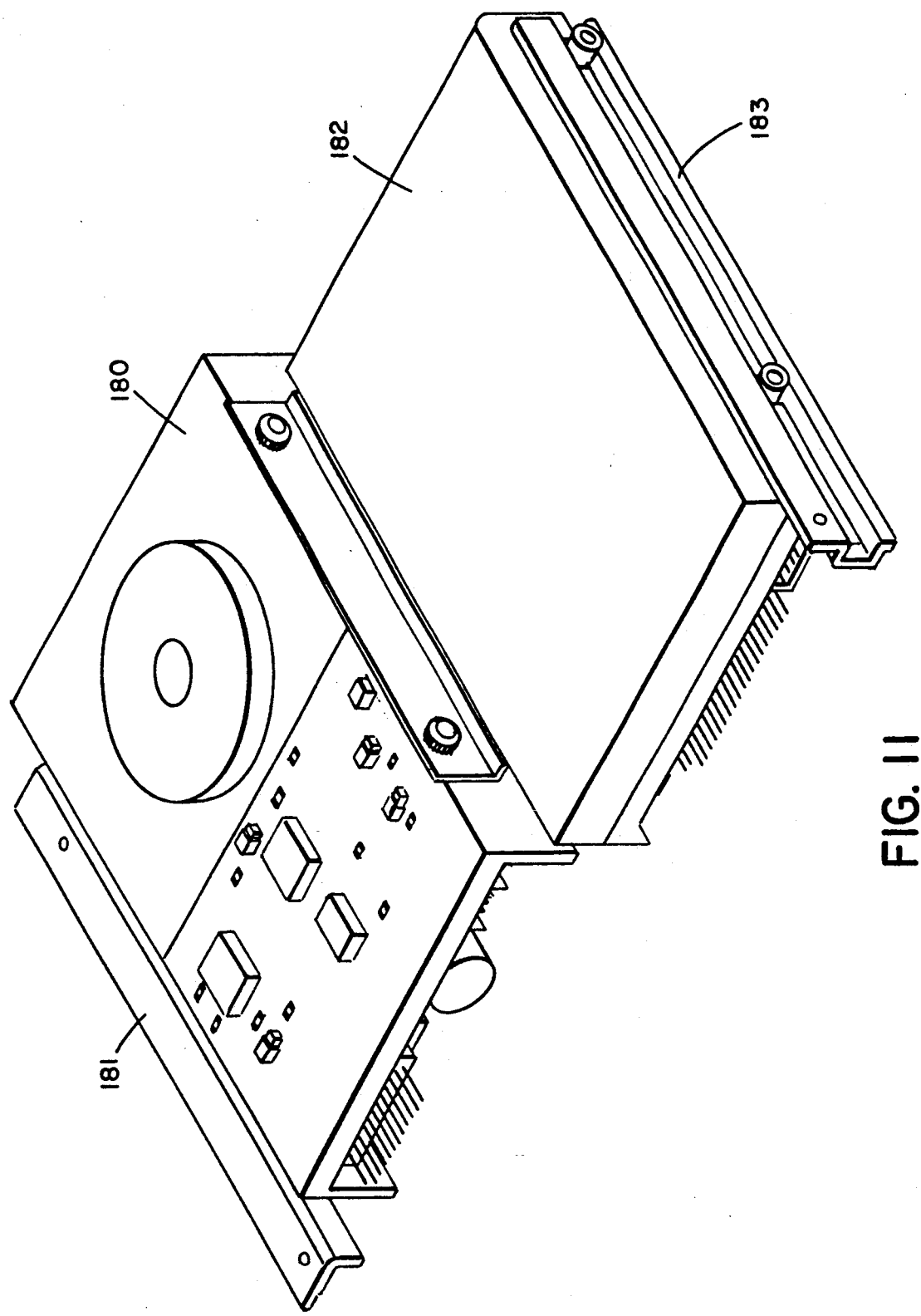
FIG. 11 shows the disk drive and hard disk.

FIG. 11 shows the optional 3.5 inch disk drive 180. The disk drive 180 enables the user to read from and write to 3.5 inch floppy disks. FIG. 11 also shows a hard disk 182 coupled to the disk drive 180. The hard disk 182 provides an additional 200 megabytes of memory. These two components 180 and 182 occupy the first expansion slot. Flanges 181 and 183 respectively sit in grooves 185 and 187 of FIG. 8.

Figure 12:
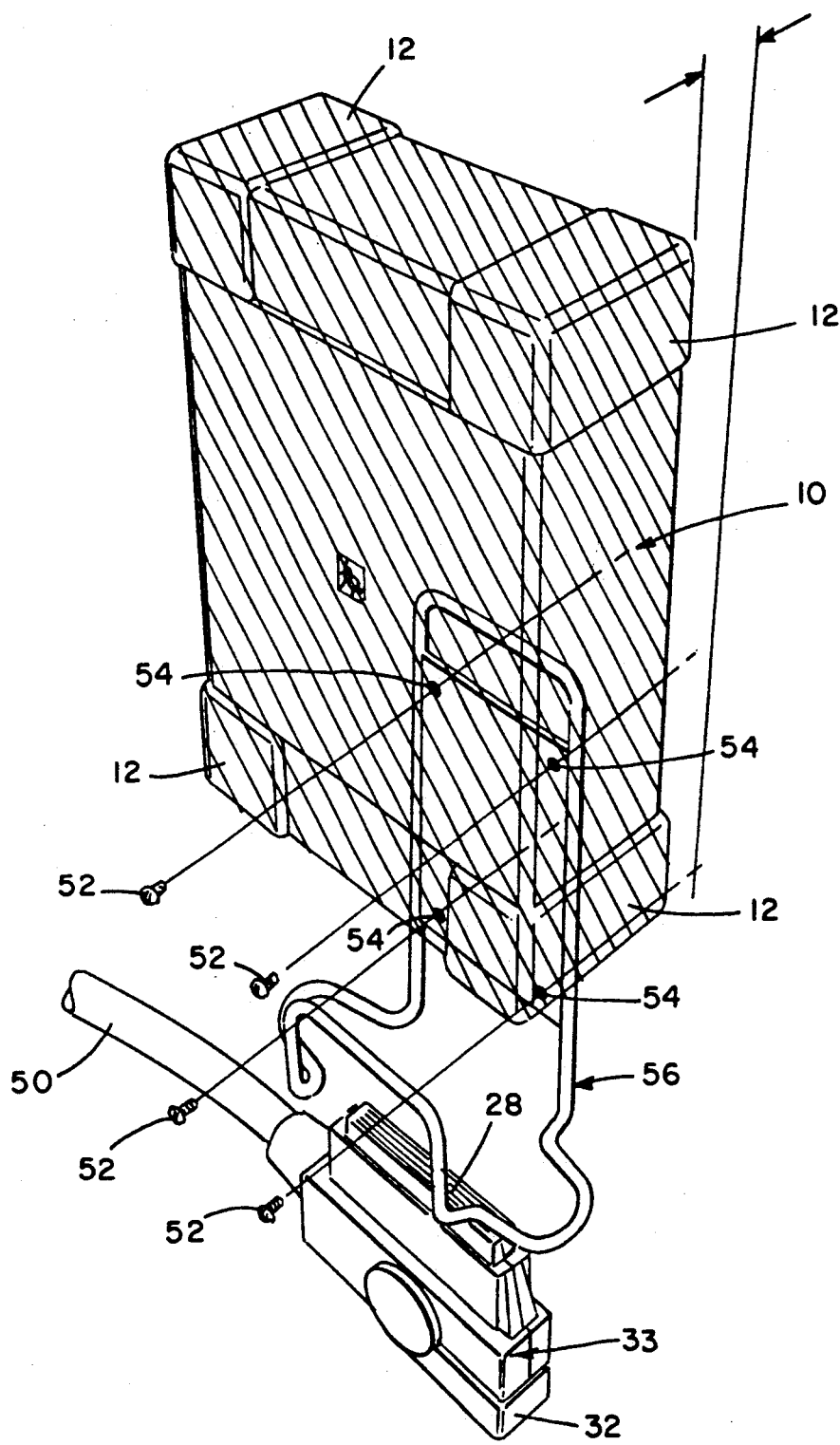
FIG. 12 depicts a mounting bracket.

FIG. 12 depicts a holding mount 56. This mount 56 can be used to secure the main housing 10 to a fixture such as a wall or a desk. The mount 56 is placed underneath the main housing 10 to hold it in proper position. The mount 56 is then secured by screws 52 through holes 54 provided in the mount 56 to the appropriate fixture. This feature, like the previously described cradle mechanism, assists in removing components that do not require physical user interaction away from the area of the user interface.

Figure 13:
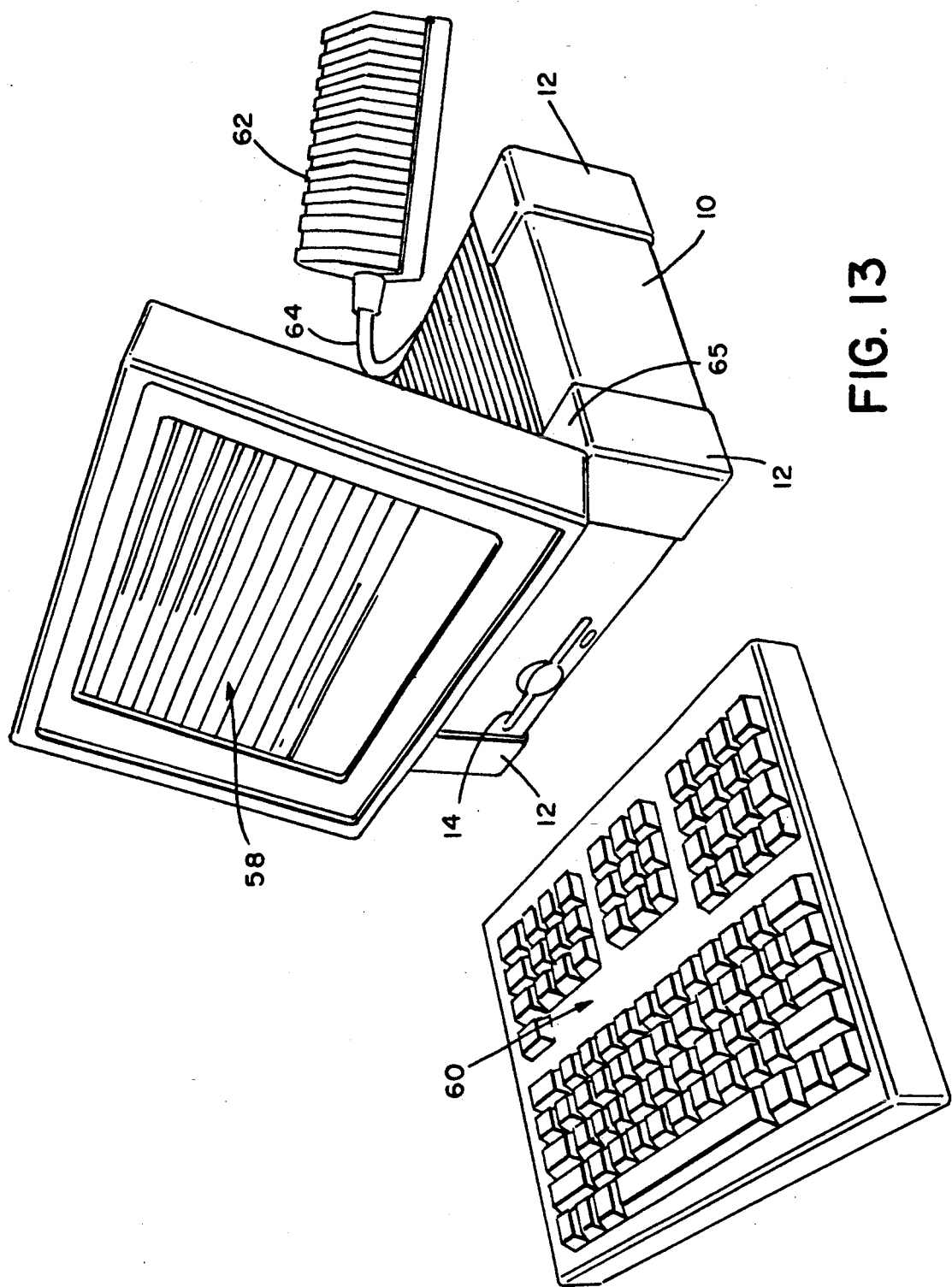
FIG. 13 shows a possible configuration of the microcomputer system that includes a keyboard, a visual display and a dc power source.

FIG. 13 shows a keyboard 60 and a visual display 58 which may be coupled to the microcomputer system. The system may also be connected to a dc power source 62 via a separate connection cable 64. The dc power source 62 may be connected directly into an ac outlet.

Figure 14:
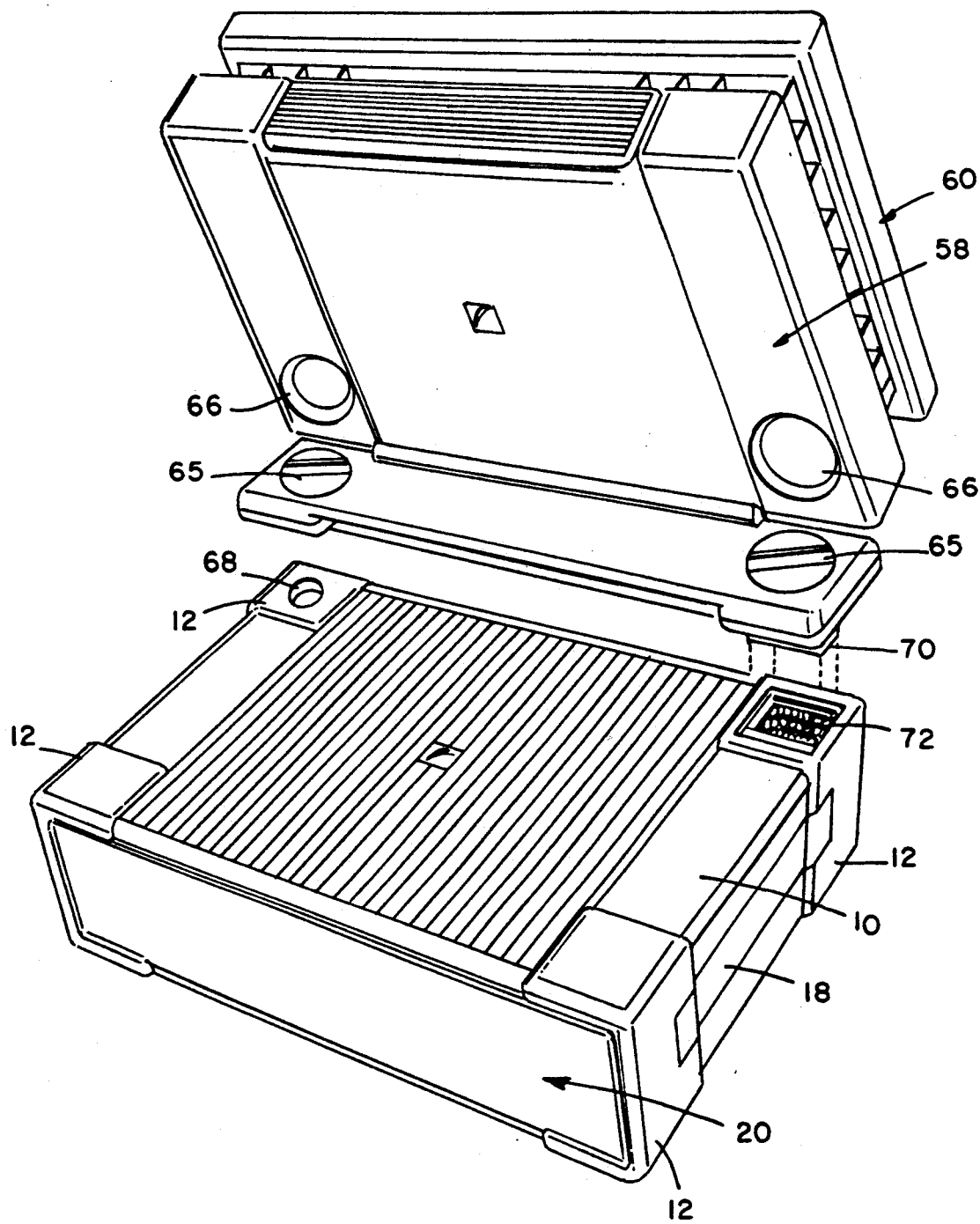
FIG. 14 depicts the connection of the visual display to the top of the main housing.

FIG. 14 reveals the simplified connection of the display 58 to the main housing 10. In particular, the display 58 is provided with connector 70 that fits into matching connector 72 in the housing. As can be seen in FIG. 14 the matching connectors are located at the top of one of the rubber corners 12. Physical connection of the display 58 to the main housing 10 is also facilitated by a mechanical mechanism that passes through hole 68. Thumb screws 65 are provided at both points to enable the user to readily tighten the mechanical connections to make sure that they are secure. The thumb screw 65, likewise, simplifies the process of removing the mechanical connections. Recesses 66 are provided in the display 58 so that the display 58 may lie flat against the main housing 10.

Figure 15:
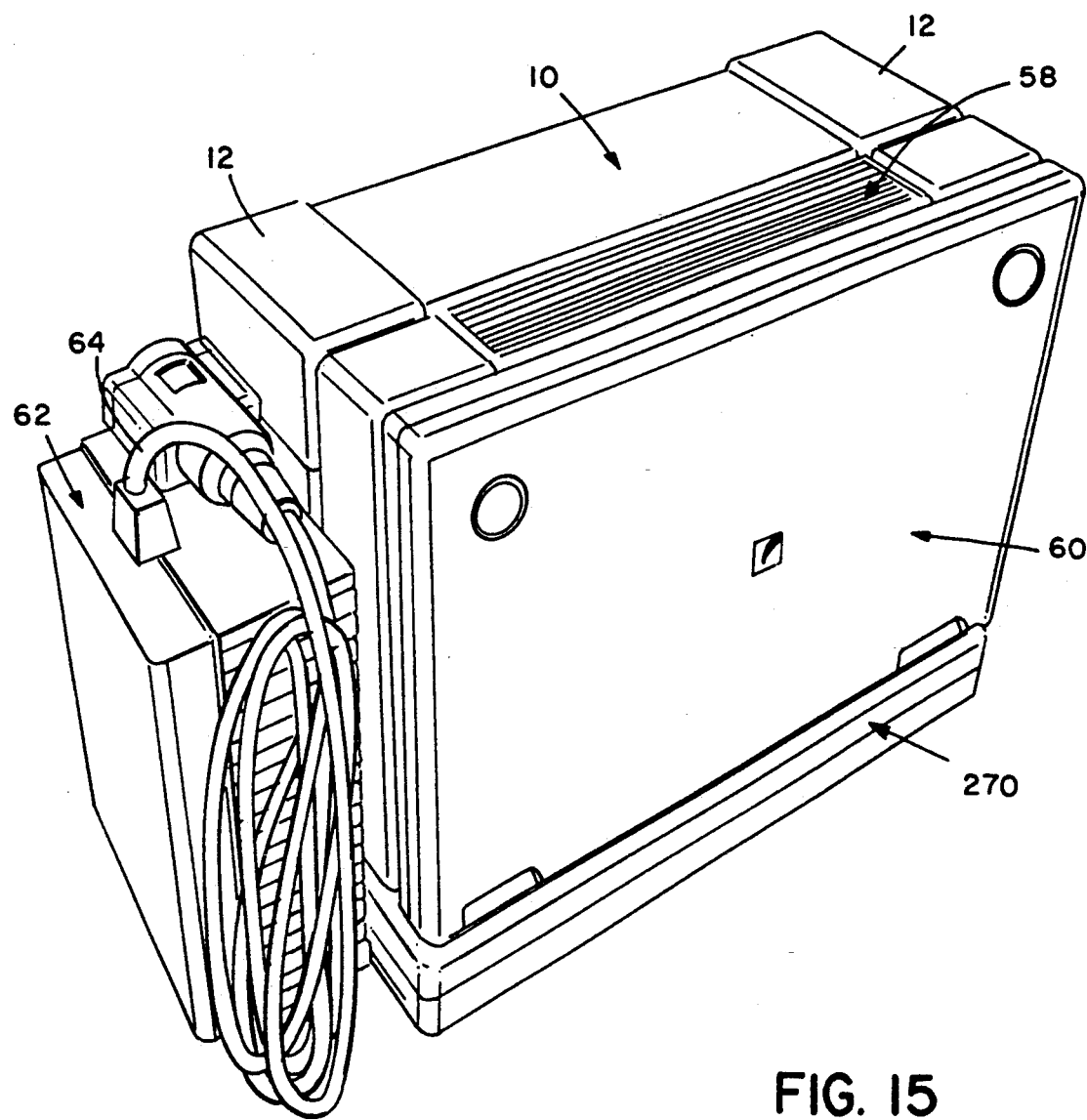
FIG. 15 illustrates how the components of the microcomputer system may be folded together to facilitate portability.

FIG. 15 exhibits the compactness of the present system and how well the various components fit together. It should be noted that the housing 10 fits readily with the display 58 and keyboard 60. Moreover, the dc power source 62 and cable 64 fit along the side of these other components. Lastly a battery pack 270 may be employed underneath the keyboard and display to provide an alternative source of direct current (dc). The battery pack 70 is especially useful in providing power to the unit when ac outlets are not available.

If a user wishes to expand the performance, capabilities of the system, he may purchase an expansion unit 72 (FIG. 16). The expansion unit 72 contains two full length processor boards, each having an IBM PC AT microprocessor configured on it. The expansion board is connected to the housing 10 via the docking door 18. In addition, the expansion unit contains a power supply.

Figure 18:
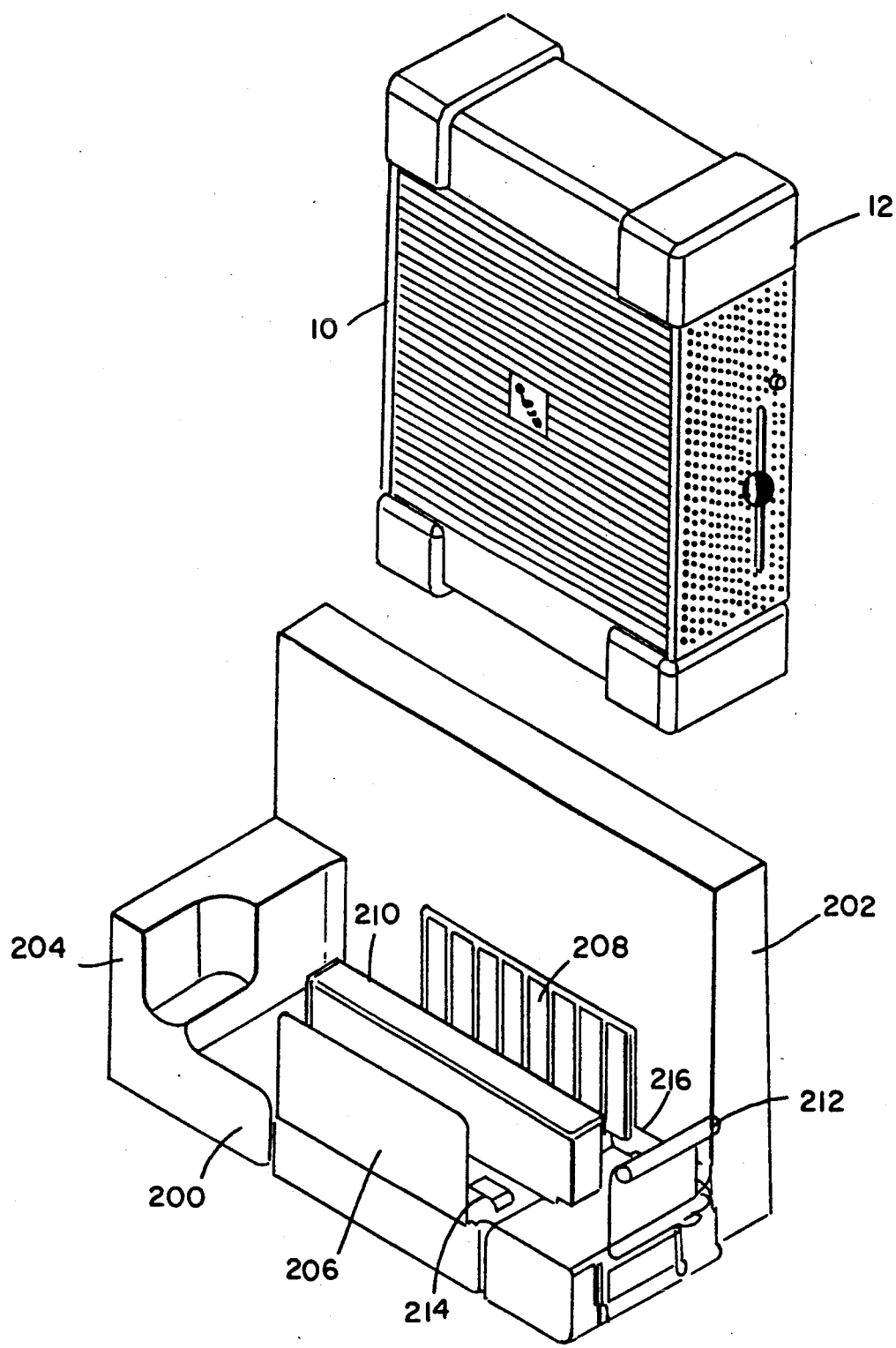
FIG. 18 illustrates an alternative embodiment of the cradle.

FIG. 18 illustrates another embodiment of the cradle with the computer housing at 10 shown over the cradle being moved into docking position. The cradle has a base 200 and a rear wall 202 in which an option card may be mounted. The far surface of an end wall 204 serves as the connector field. That is, all of the individual connections to the cradle are made directly to the far side of that wall. The housing 10 is moved into position between guides 206 and 208 so that the connector 210 extends past the docking door 18 into the housing 10 to make connection to the computer. Ejection of the computer housing is by means of a lever 212 which, when pulled down, causes ejection tabs 214 and 216 to lift the housing 10 from the cradle.

Figure 19:
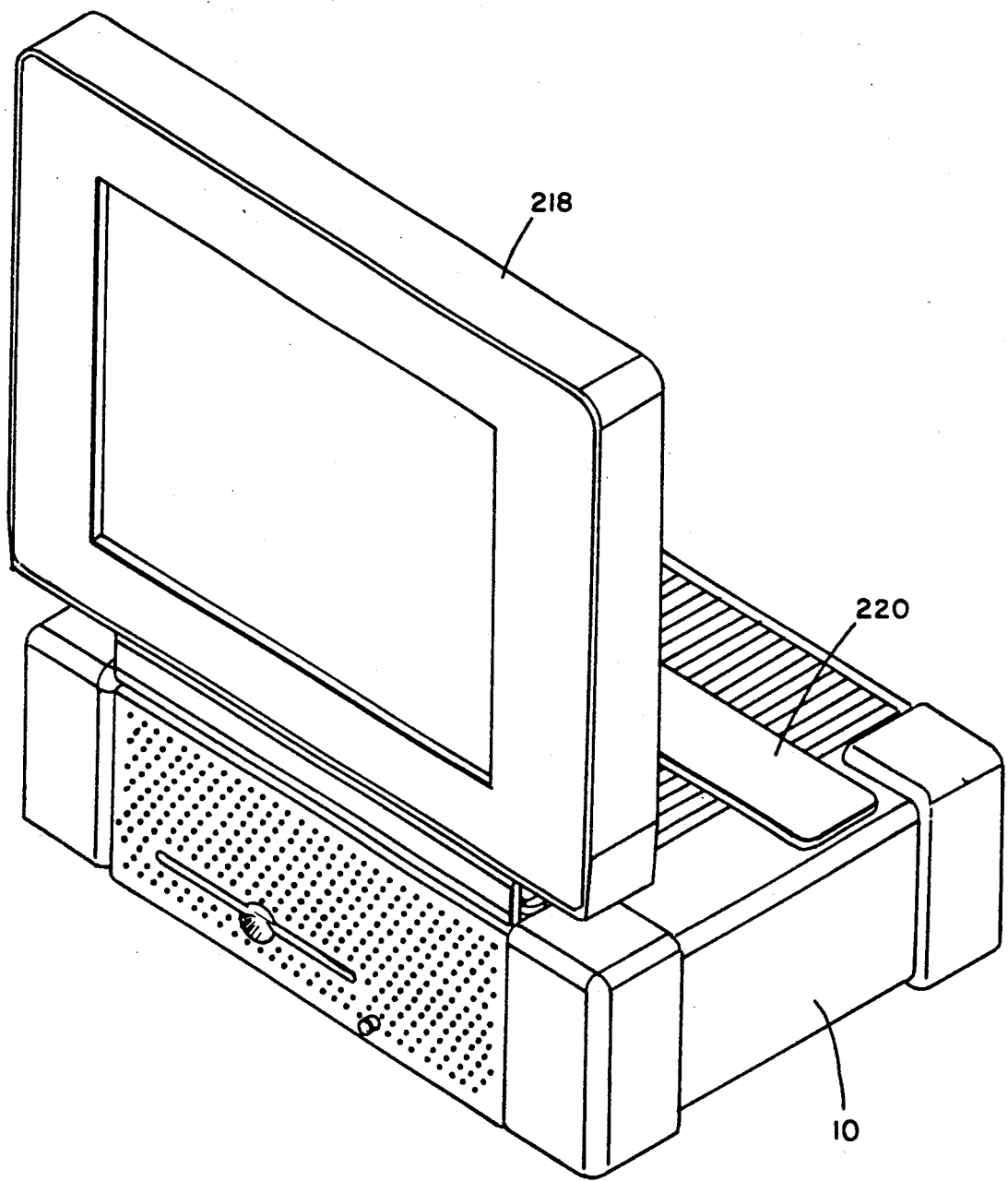
FIG. 19 illustrates an alternative display.

FIG. 19 illustrates an alternative form of display. In this embodiment, the display housing 218 is not fixed directly to the computer housing 10. Rather, it is an independent unit having a stand 220 so that it may rest on a table surface, or on top of the housing 10 as shown in FIG. 19.

While the invention has been particularly shown and described with reference to preferred embodiments thereof, it will be understood by those skilled in the art that various changes in form and detail may be made without departing from the spirit and scope of the invention as defined in appended claims. For instance, the system need not have two ½ length cards, rather a larger housing may be employed to yield a system that can accept full length cards.

We claim:

1. An electronic system comprising:
   a housing;
   a circuit board within the housing having a front side with electronic components mounted thereon and a rearward back side contacting a heat sink such that the back side is thermally coupled to the housing by the heat sink;
   a mounting board mounted on the front side of the circuit board; and
   a heat generating electronic component having a mounting side and a top side, the heat generating component being mounted on the mounting board and facing rearwardly where the top side of the heat generating component contacts the heat sink such that the heat generating component is thermally coupled to the housing by the heat sink.

2. An electronic system as recited in claim 1 wherein the heat sink is a liquid-filled thermal heat sink pouch between the circuit board and the housing.

3. An electronic system as recited in claim 1 wherein the heat generating component protrudes through a window in the circuit board.

4. An electronic system as recited in claim 1 wherein the mounting board comprises a second mounting circuit board to which the electronic component is mounted, the second mounting circuit board being mounted on the front side of the first circuit board.

* * * * *

UNITED STATES PATENT AND TRADEMARK OFFICE
CERTIFICATE OF CORRECTION

PATENT NO. : 5,289,342  Page 1 of 2

DATED : February 22, 1994

INVENTOR(S) : Tom J. Spalding, et al

It is certified that error appears in the above-indentified patent and that said Letters Patent is hereby corrected as shown below:

In the drawing, consisting of Figure 9, should be deleted to be replace with the drawing sheet, consisting of Figure 9, as shown on the attached page.

Signed and Sealed this

Fifth Day of July, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,289,342     Page 2 of 2
DATED      : February 22, 1994
INVENTOR(S): Tom J. Spalding et al.

It is certified that error appears in the above-indentified patent and that said Letters Patent is hereby corrected as shown below:

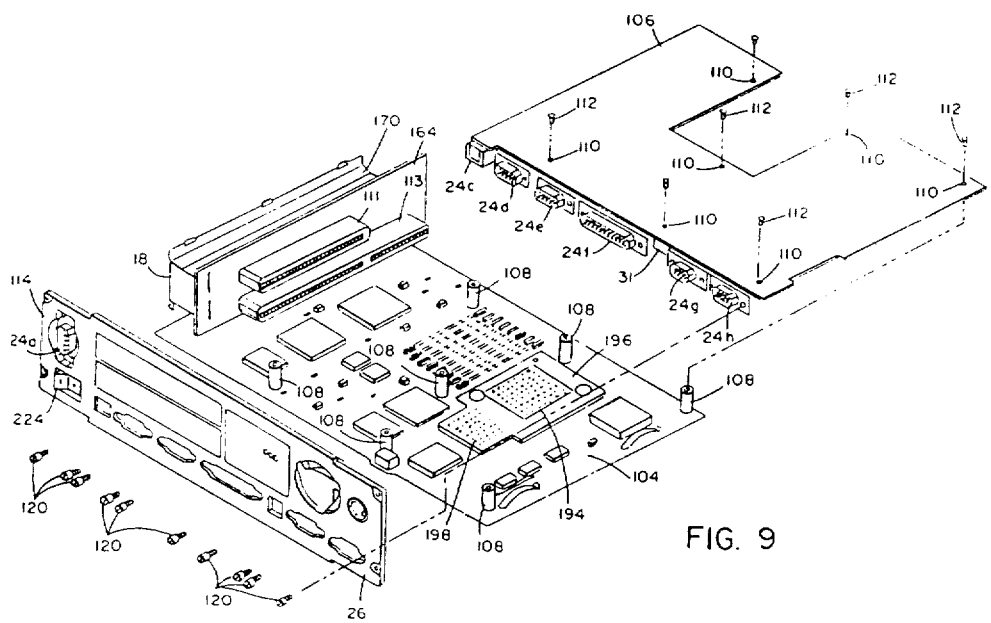

FIG. 9